US011496251B2

(12) United States Patent
Paz et al.

(10) Patent No.: US 11,496,251 B2
(45) Date of Patent: Nov. 8, 2022

(54) HARQ RESOURCE ALLOCATION FOR MLC-MSD

(71) Applicant: QUALCOMM Incorporated, San Diego, CA (US)

(72) Inventors: Daniel Paz, Geva Carmel (IL); Michael Levitsky, Rehovot (IL); Idan Michael Horn, Hod Hasharon (IL); Amit Bar-Or Tillinger, Tel-Aviv (IL); Assaf Touboul, Netanya (IL)

(73) Assignee: QUALCOMM INCORPORATED, San Diego, CA (US)

( * ) Notice: Subject to any disclaimer, the term of this patent is extended or adjusted under 35 U.S.C. 154(b) by 78 days.

(21) Appl. No.: 17/187,582

(22) Filed: Feb. 26, 2021

(65) Prior Publication Data
US 2022/0278777 A1 Sep. 1, 2022

(51) Int. Cl.
*H04L 1/18* (2006.01)
*H04L 1/00* (2006.01)
*H04L 1/06* (2006.01)

(52) U.S. Cl.
CPC .......... *H04L 1/1819* (2013.01); *H04L 1/005* (2013.01); *H04L 1/0061* (2013.01); *H04L 1/0643* (2013.01); *H04L 1/1896* (2013.01)

(58) Field of Classification Search
None
See application file for complete search history.

(56) References Cited

U.S. PATENT DOCUMENTS

| | | | |
|---|---|---|---|
| 2017/0311331 A1* | 10/2017 | Chae | H04L 25/0222 |
| 2020/0274647 A1* | 8/2020 | Shevchenko | H04L 1/1819 |
| 2022/0014316 A1* | 1/2022 | Levitsky | H04L 1/1864 |

* cited by examiner

*Primary Examiner* — Brandon M Renner
(74) *Attorney, Agent, or Firm* — Procopio, Cory, Hargreaves & Savitch LLP

(57) ABSTRACT

The apparatus, which may be a receiving device, is disclosed. The apparatus may receive at least one HARQ retransmission of at least one first bit. The HARQ retransmission may be associated with an MLC scheme including MSD. The MLC scheme may include a plurality of bits with the at least one first bit and at least one second bit. The apparatus may decode the at least one first bit of the MLC scheme based on the at least one HARQ retransmission. The apparatus may determine whether the at least one first bit of the MLC scheme is decoded successfully. The apparatus may decode, upon determining that the at least one first bit of the MLC scheme is decoded successfully, the at least one second bit of the MLC scheme based on at least one ARQ retransmission of the at least one second bit.

29 Claims, 10 Drawing Sheets

HARQ RESOURCE ALLOCATION FOR MLC-MSD

BACKGROUND

Technical Field

The present disclosure relates generally to communication systems, and more particularly, to error correction usable with a multi-level coding (MLC) scheme.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a receiving device. The apparatus may receive at least one hybrid automatic repeat request (HARQ) retransmission of at least one first bit. The HARQ retransmission may be associated with a multi-level coding (MLC) scheme including multi-stage-decoding (MSD). The MLC scheme may include a plurality of bits with the at least one first bit and at least one second bit. The at least one first bit may correspond to a first level of the plurality of bits and the at least one second bit may correspond to a second level of the plurality of bits. The apparatus may decode the at least one first bit of the MLC scheme based on the at least one HARQ retransmission. The apparatus may determine whether the at least one first bit of the MLC scheme is decoded successfully. The apparatus may decode, upon determining that the at least one first bit of the MLC scheme is decoded successfully, the at least one second bit of the MLC scheme based on at least one automatic repeat request (ARQ) retransmission of the at least one second bit.

In an aspect of the disclosure, a method, a computer-readable medium, and an apparatus are provided. The apparatus may be a transmitting device. The apparatus may determine an MLC scheme including MSD. The MLC scheme may include a plurality of bits with at least one first bit and at least one second bit. The at least one first bit may correspond to a first level of the plurality of bits and the at least one second bit may correspond to a second level of the plurality of bits. The apparatus may encode the at least one first bit of the MLC scheme for at least one HARQ retransmission. The apparatus may transmit, upon encoding the at least one first bit of the MLC scheme, the at least one HARQ retransmission of the at least one first bit associated with the MLC scheme.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
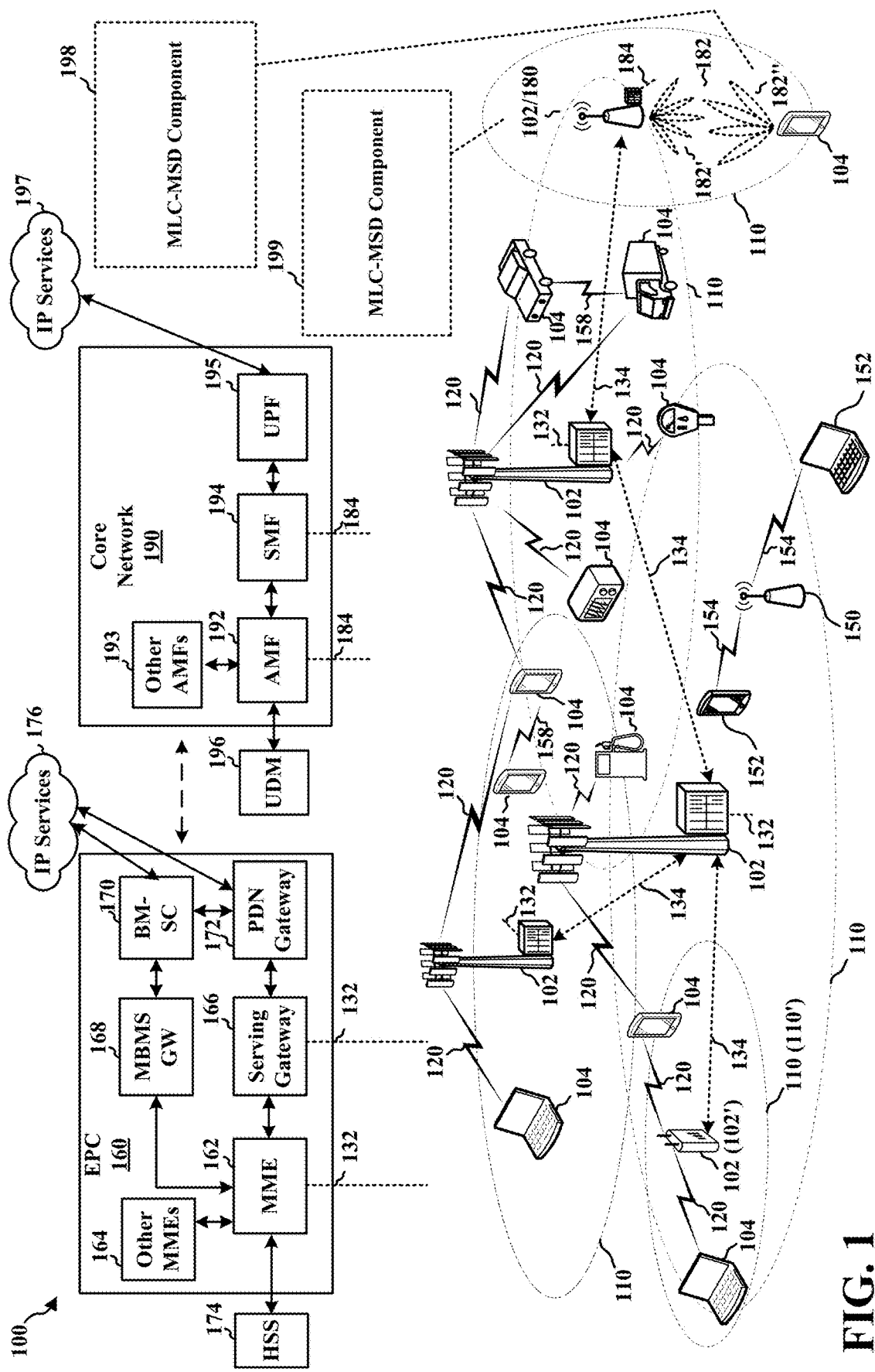
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an MLC-MSD component 198. In certain aspects, the base station 180 may include an MLC-MSD component 199. When the UE 104 corresponds to a transmitting device, the base station 180 may correspond to a receiving device. When the UE 104 corresponds to a receiving device, the base station 180 may correspond to a transmitting device. The MLC-MSD component 198/199 of the receiving device may be configured to receive at least one HARQ retransmission of at least one first bit. The HARQ retransmission may be associated with an MLC scheme including MSD. The MLC scheme may include a plurality of bits with the at least one first bit and at least one second bit. The at least one first bit may correspond to a first level of the plurality of bits and the at least one second bit may correspond to a second level of the plurality of bits. The MLC-MSD component 198/199 of the receiving device may be further configured to decode the at least one first bit of the MLC scheme based on the at least one HARQ retransmission. The MLC-MSD component 198/199 of the receiving device may be further configured to determine whether the at least one first bit of the MLC scheme is decoded successfully. The MLC-MSD component 198/199 of the receiving device may be further configured to decode, upon determining that the at least one first bit of the MLC scheme is decoded successfully, the at least one second bit of the MLC scheme based on at least one ARQ retransmission of the at least one second bit.

The MLC-MSD component 198/199 of the transmitting device may be configured to determine an MLC scheme including MSD. The MLC scheme may include a plurality of bits with at least one first bit and at least one second bit. The at least one first bit may correspond to a first level of the plurality of bits and the at least one second bit may correspond to a second level of the plurality of bits. The MLC-MSD component 198/199 of the transmitting device may be further configured to encode the at least one first bit of the MLC scheme for at least one HARQ retransmission. The MLC-MSD component 198/199 of the transmitting device may be further configured to transmit, upon encoding the at least one first bit of the MLC scheme, the at least one HARQ retransmission of the at least one first bit associated with the MLC scheme. Although the following description may be focused on 5G NR, the concepts described herein may be applicable to other similar areas, such as LTE, LTE-A, CDMA, GSM, and other wireless technologies.

Figure 2:
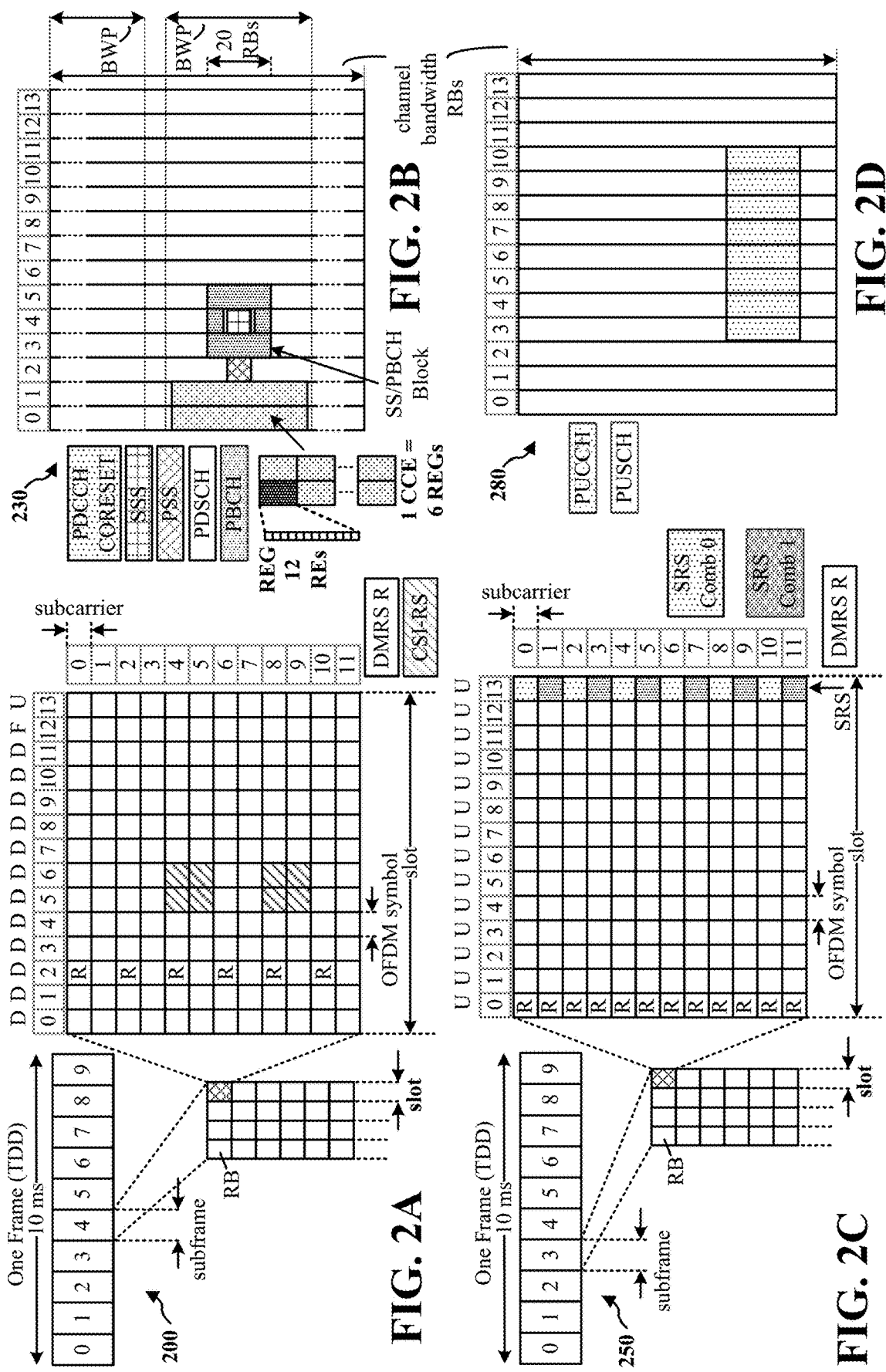
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
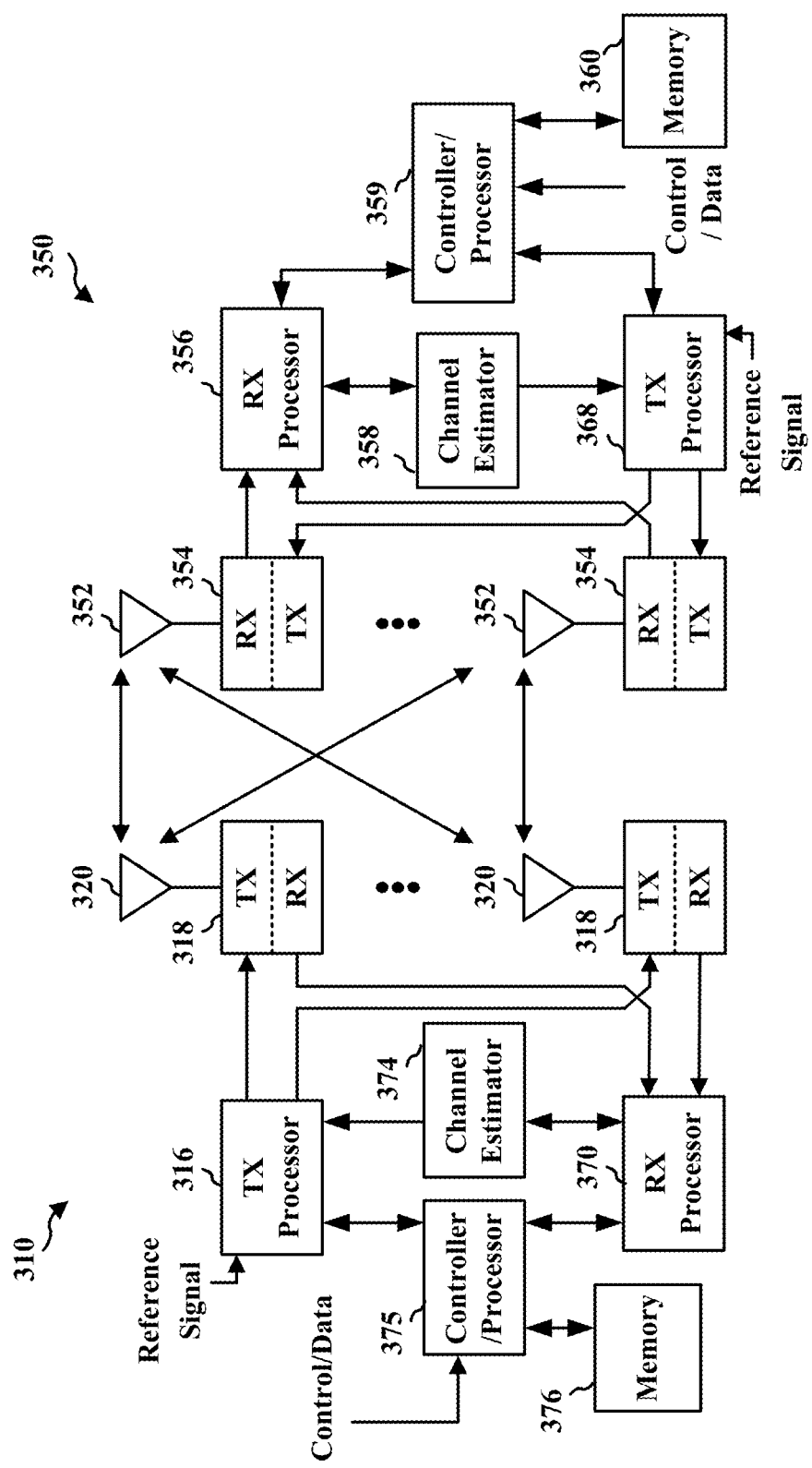
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

In some aspects of wireless communication, MLC may be a method to optimize the spectral efficiency of a communication system. MLC with MSD where the highest level is left uncoded or coded with a high-rate low complexity code may be beneficial for reducing power consumption, especially in systems, e.g., sub-Terahertz (THz) systems, that may have a very large bandwidth where the encoding and decoding process may consume most of the power in a digital signal processor (DSP). MLC with MSD where the highest level is left uncoded or coded with a high-rate low complexity code may be suitable for the slow varying channels scenario with well separated layers. Such a scenario may be applicable for any polarized MIMO communications such as sub-THz communication, a typical millimeter wave (mmW) link, and for the high order QAM use case for sub-6 cases (e.g., integrated access and backhaul "IAB" or customer premises equipment "CPE" devices supporting 1k QAM and above modulations). Additional use cases may be related to scenarios with a single layer transmission that can be useful for reduced complexity and power devices that may operate in the power limited regime or come with a single antenna limitation (e.g., a low cost, low power device).

For non-MLC systems, the HARQ resources may be dedicated for all the message/modulated symbol bits since there is no separation to coding levels, while for MLC it may be possible to separate the HARQ procedure to support each level individually. An efficient HARQ procedure may be defined for a communication system that employs the MLC technique with MSD to reduce power consumption. A lower complexity HARQ scheme that may also reduce the volume of retransmissions and may result in an overall link throughput enhancement may be provided.

According to some aspects, in a two-level MLC-MSD system where the highest (i.e., the second) level is uncoded or coded with a high-rate low complexity code, all the HARQ related resources may be used for the lowest (i.e., the first) coding level HARQ retransmissions to guarantee first coding level decoding with a small number of retransmissions. For cases of cyclic redundancy check (CRC) failure on the second coding level given successful decoding of the first level, a full retransmission (e.g., a simple ARQ retransmission for reduced complexity) of the data for the second level may be employed. Overall, the scheme may allow for a reduction in the volume of retransmissions and a correspondingly increased link efficiency with a reduced complexity HARQ process defined for the MLC-MSD transmission scheme that may be considered for reducing power consumption.

With MLC, different component codes may be assigned for non-overlapping subsets of bits, referred to as levels. MLC may also be referred to as unequal error protection. For example, a code "00100010," which may represent a QAM symbol, may include 2 levels: Level 1, or Component Code 1, may include the first 4 bits "0010," whereas Level 2, or Component Code 2, may include the last 4 bits "0010." The two levels may be coded with a different channel coding (e.g., with different code rates) to improve spectral efficiency. MSD may be utilized to decode the MLC levels in a sequential fashion. Decoding one MLC level may be based on the knowledge obtained from decoding previous levels (e.g., partitioning information). In the example above, Level 2 may be decoded after Level 1 is first decoded.

In some aspects, bit-interleaved coded modulation (BICM) may be utilized for channel coding. In BICM, the information bits may be interleaved and encoded before being grouped into symbols and mapped to constellation points. For MSD, it may be assumed that the corresponding labeling may support set partitioning. The set partitioning criteria may be to increase the minimum Euclidian distance of the resulting constellation subsets such that the highest level may have the largest minimal Euclidian distance. Different MLC decoding methods may be more suitable or effective for different scenarios and channel conditions. For an additive white Gaussian noise (AWGN) channel, an MSD approach may be optimal (from the theoretical point of view), and may asymptotically allow for the achieving of channel capacity.

Additionally, the optimal number of bits and the selected code rates for each level may be adjusted for different signal-to-noise ratio (SNR) regions in order to maximize the spectral efficiency. With an MLC-MSD scheme, the MLC may be repurposed for power consumption reduction for the decoding process. Accordingly, an MLC-MSD scheme where dynamic selection of set partitioning (the bit length for Level 1 related bits in symbol coding) and the corresponding code rate for Level 1 may allow for an uncoded second level or the use of a high-rate low complexity code for the second level.

MSD may assume sequential decoding of MLC levels from the lowest to the highest while decoding each previous level may provide code protected partitioning information for the next decoding level. If the first decoding level fails, the second level decoding may typically fail as well. The observation may be known as an error propagation of the MSD. From the other side, the second level decoding may be successful with a very high probability once the corresponding partitioning information is known (i.e., a successful decoding of the first level).

In general, 2-level MLC with an uncoded second level or a second level coded with a high-rate low complexity code may not be suitable for all channel conditions and transmission schemes, even with a high SNR, since the second level may become very sensitive to residual errors. However, this approach may be suitable for several specific scenarios where it is important to reduce power consumption (e.g., in a sub-THz scenario). Therefore, the scheme may be utilized for a number of cases. For example, the scheme may be applicable with polarized MIMO communications where there may be a good separation between the layers (e.g., sub-THz, mmW) and low delay spread (DS) static channels. The scheme may also be utilized with a multi-layer transmission with a high order QAM where there may be a very good separation between the layers. The "superQAM" scenario may be relevant over static channels also having a limited DS (e.g., IAB or CPE devices). The scheme may also be utilized with a single layer transmission over slow varying channels (e.g., low cost, low power devices).

Simulation results for the clustered delay line (CDL) B channel with a velocity of 5 km/h in FR2, where two spatial streams may be used, may show that the second level should be equipped with minimal error correction capabilities in order to suppress the residual errors caused by the sub-optimal separation of the spatial streams. Further, 2-level MLC-MSD with an uncoded Level 2 or a Level 2 coded with a high-rate low complexity code may achieve similar spectral efficiency when compared to a BICM system for the relevant scenarios, while also allowing for the reduction of power consumption.

When employing 2-level MLC-MSD where the second level is uncoded or coded with a high-rate low complexity code, the main bottleneck of the system, in terms of block error rate (BLER), may be the first level which has a worse minimal Euclidean distance. Therefore, the Level 2 CRC may be likely to pass once the Level 1 CRC has passed. Also, due to the error propagation in the MSD process, once the Level 1 CRC fails, the Level 2 CRC may fail as well.

Accordingly, in some aspects, all the HARQ retransmission resources may be invested in Level 1 HARQ retransmissions in order to increase the overall HARQ efficiency and correspondingly the MLC-MSD link efficiency. For Level 2 data, a simple ARQ approach (transparent for the PHY) may be employed. Therefore, the probability of successful Level 1 decoding after a single HARQ retransmission may be increased. Given that Level 2 may be associated with a high probability for successful decoding when the CRC passes for Level 1, a successful data decoding from both MLC levels may be very likely after a single retransmission for Level 1 for most retransmission events.

Figure 4:
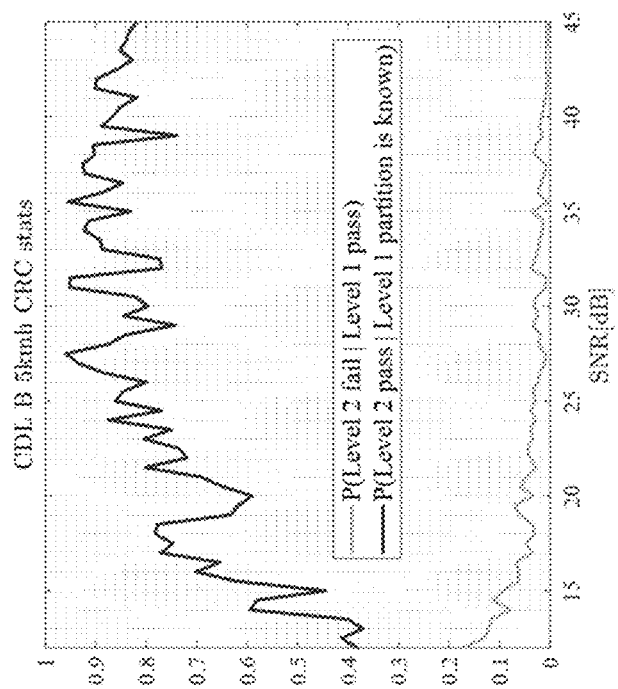
FIG. 4 is a diagram illustrating CRC statistics related simulation results for the CDL B channel with a velocity of 5 km/h.

FIG. 4 is a diagram 400 illustrating CRC statistics related simulation results for the CDL B channel with a velocity of 5 km/h. As shown in FIG. 4, the Level 2 CRC may be likely to pass once Level 1 has been successfully decoded.

Figure 5:
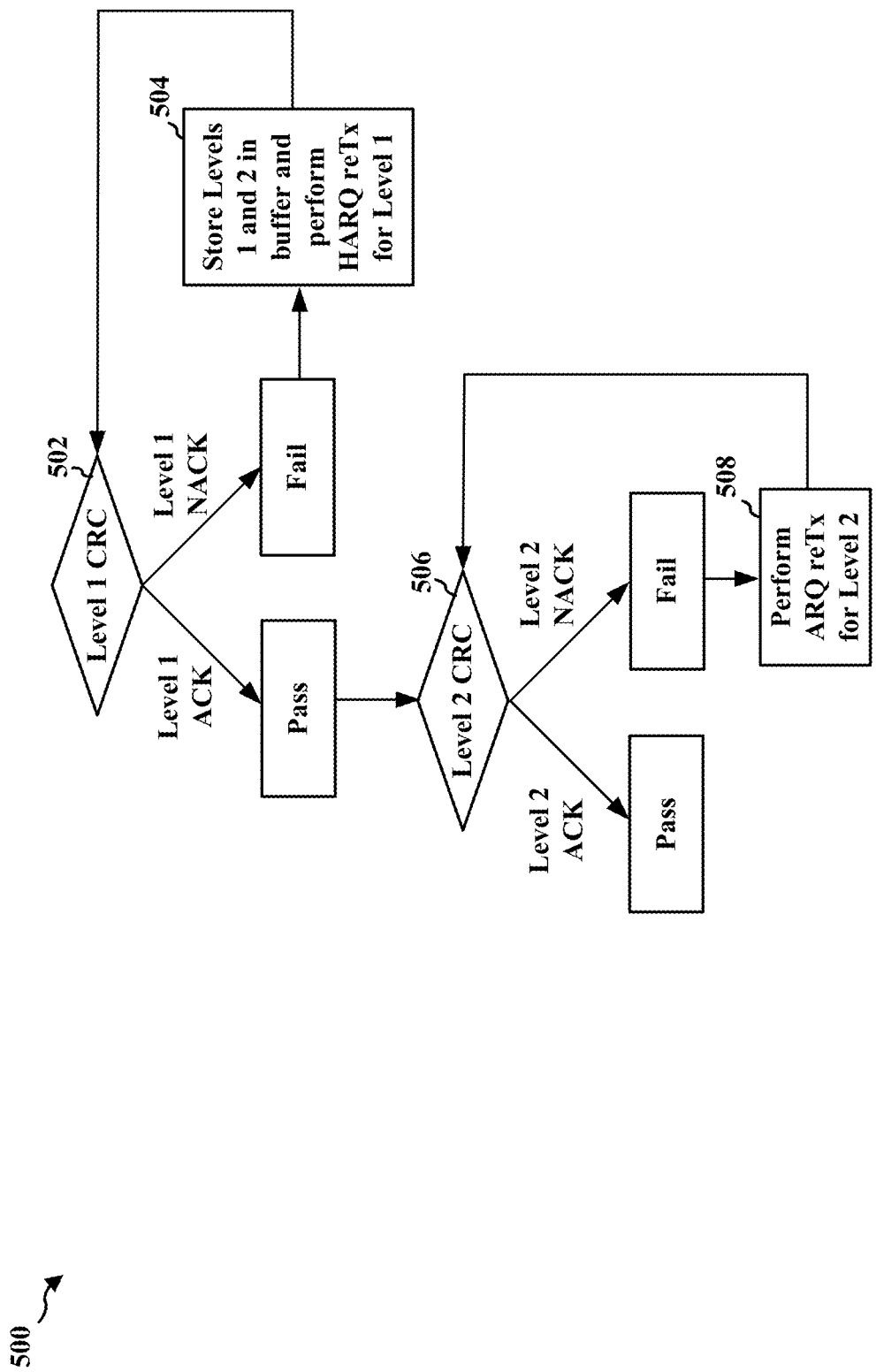
FIG. 5 is a flowchart of a method of wireless communication.

FIG. 5 is a flowchart of a method 500 of wireless communication according to aspects. The method 500 may be performed at a receiving device. At 502, the receiving device may perform a Level 1 CRC to determine whether Level 1 has been decoded successfully. In case Level 1 has not been decoded successfully, the receiving device may transmit a NACK for Level 1 to the transmitting device to initiate one or more HARQ retransmissions for Level 1. At 504, the receiving device may store received information for Levels 1 and 2 in a buffer, and perform one or more HARQ retransmissions for Level 1 in concert with the transmitting device. After each HARQ retransmission for Level 1, the receiving device may perform another Level 1 CRC to determine whether Level 1 has been decoded successfully. Additional HARQ retransmissions may be performed for Level 1, until the receiving device determines at 502 that Level 1 CRC has passed.

Upon determining at 502 that Level 1 CRC has passed, the receiving device may transmit an ACK for Level 1 to the transmitting device. Thereafter, at 506, the receiving device may perform Level 2 CRC to determine whether Level 2 has been decoded successfully. In case Level 2 has not been decoded successfully, the receiving device may transmit a NACK for Level 2 to the transmitting device to initiate one or more ARQ retransmissions for Level 2. At 508, the receiving device may perform one or more ARQ retransmissions for Level 2 in concert with the transmitting device.

After each ARQ retransmission for Level 1, the receiving device may perform another Level 2 CRC to determine whether Level 2 has been decoded successfully. Additional ARQ retransmissions may be performed for Level 2, until the receiving device determines at 506 that Level 2 CRC has passed. The passing of Level 2 CRC at 506 may indicate that the whole symbol has been decoded successfully.

Figure 6:
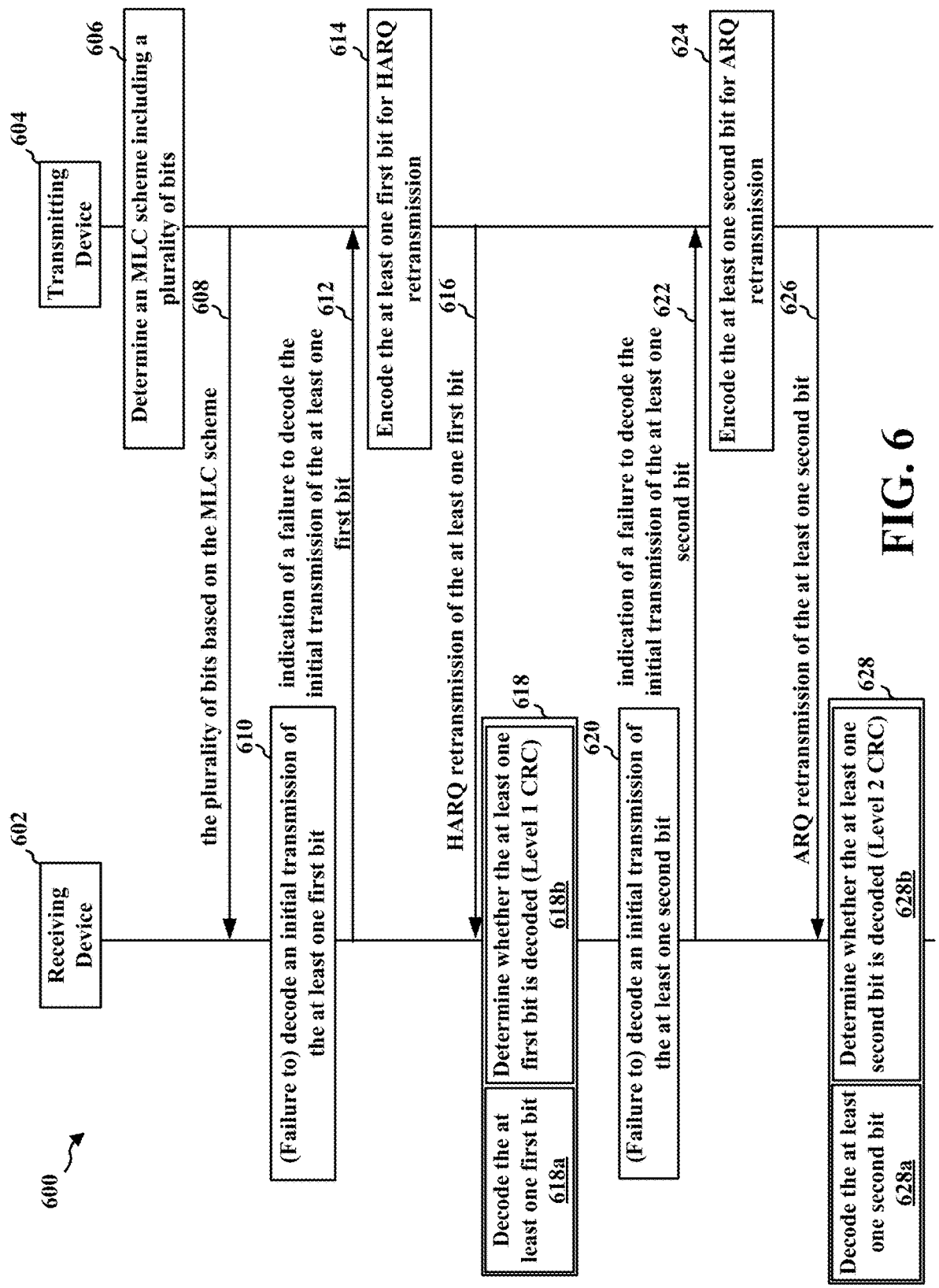
FIG. 6 is a diagram illustrating a communication flow according to aspects.

FIG. 6 is a diagram illustrating a communication flow 600 according to aspects of the present disclosure. At 606, the transmitting device 604 may determine an MLC scheme including MSD. The MLC scheme may include a plurality of bits with at least one first bit and at least one second bit. The at least one first bit may correspond to a first level of the plurality of bits and the at least one second bit may correspond to a second level of the plurality of bits. At 608, the transmitting device 604 may transmit to the receiving device, and the receiving device 602 may receive from the transmitting device 604, the plurality of bits based on the MLC scheme. At 610, the receiving device 602 may fail to decode an initial transmission of the at least one first bit without any HARQ retransmission. If the receiving device 602 does not fail to decode the initial transmission of the at least one first bit (not shown), the receiving device 602 may directly proceed to attempt to decode the at least one second bit (not shown). At 612, the receiving device 602 may transmit to the transmitting device 604, and the transmitting device 604 may receive from the receiving device 602, an indication of the failure at the receiving device 602 to decode the initial transmission of the at least one first bit without any HARQ retransmission. At 614, the transmitting device 604 may encode the at least one first bit for at least one HARQ retransmission. At 616, the transmitting device 604 may transmit to the receiving device, and the receiving device 602 may receive from the transmitting device 604, the at least one HARQ retransmission of the at least one first bit. At 618*a*, the receiving device 602 may decode the at least one first bit based on the at least one HARQ retransmission. At 618*b*, the receiving device 602 may determine whether the at least one first bit is decoded successfully. If the receiving device 602 determines that the at least one first bit is not decoded successfully (not shown), the receiving device 602 may transmit an indication of the failure to the transmitting device 604, and the transmitting device may in response prepare and transmit additional HARQ retransmissions, so the receiving device 602 may further attempt to decode the at least one first bit (i.e., ACK/NACK Level 1).

Upon successfully decoding the at least one first bit of the MLC scheme, at 620, the receiving device 602 may fail to decode an initial transmission of the at least one second bit without any ARQ retransmission. If the receiving device 602 does not fail to decode the initial transmission of the at least one first bit (not shown), the receiving device 602 may have successfully decoded all the plurality of bits. At 622, the receiving device 602 may transmit to the transmitting device 604, and the transmitting device 604 may receive from the receiving device 602, an indication of the failure at the receiving device 602 to decode the initial transmission of the at least one second bit without any ARQ retransmission. At 624, the transmitting device 604 may encode the at least one second bit for at least one ARQ retransmission. At 626, the transmitting device 604 may transmit to the receiving device, and the receiving device 602 may receive from the transmitting device 604, the at least one ARQ retransmission of the at least one second bit. At 628*a*, the receiving device 602 may decode the at least one second bit based on the at least one ARQ retransmission. At 628*b*, the receiving device 602 may determine whether the at least one second bit is decoded successfully. If the receiving device 602 determines that the at least one second bit is not decoded successfully (not shown), the receiving device 602 may transmit an indication of the failure to the transmitting device 604, and the transmitting device 604 may in response prepare and transmit additional ARQ retransmissions so the receiving device 602 may further attempt to decode the at least one second bit (i.e., ACK/NACK Level 2). Upon successfully decoding the at least one second bit of the MLC scheme, the receiving device 602 may have successfully decoded all the plurality of bits.

Therefore, HARQ may be performed at 614, 616, 618 for the at least one first bit corresponding to the first level, but not for the at least one second bit corresponding to the second level. In one aspect, Level 2 samples may be stored in a sample buffer until Level 1 passes the CRC at 618*b*. The log-likelihood ratios (LLRs) for Level 1 may be stored in an LLR buffer, and may be used for Level 1 HARQ combining until Level 1 passes the CRC at 618*b*. In case of Level 2 CRC failure at 628*b* after Level 1 has passed CRC (with or without HARQ retransmissions for Level 1) at 618*b*, a simple ARQ retransmission (i.e., RV0) may be performed at 624, 626, 628 for Level 2.

In one aspect, each of Level 1 and Level 2 may be associated with a separate code word (CW) (or transport block "TB") or a corresponding code block group (CBG), which may enable the possibility of separate and dedicated ACK/NACK signaling for each level. All the HARQ retransmission resources may be utilized in Level 1 HARQ retransmissions at 616 in order to increase the overall HARQ efficiency and correspondingly the MLC-MSD link efficiency. HARQ retransmissions for Level 1 at 616 may be performed using a single level coded modulation, and may be performed with a lowered code rate (i.e., more encoded bits per redundancy version "RV" during the retransmissions) or a smaller modulation order compared to the initial transmission (since Level 1 alone may be addressed in HARQ retransmissions).

A signaling and reporting mechanism may be utilized. In one aspect, a new DCI field may be added to signal that the Level 1 retransmission at 616 may have a non-MLC structure (i.e., retransmitted standalone). A new RV variant may be defined for the Level 1 retransmission at 616 to support more coded bits or a lower constellation order. The retransmission signaling in DCI in case of MLC-MSD based transmission may be dedicated for Level 1, where the Level 2 full retransmission may be kept transparent to the PHY (i.e., the ACK/NACK for Level 2 is not reported in the PHY).

Figure 7:
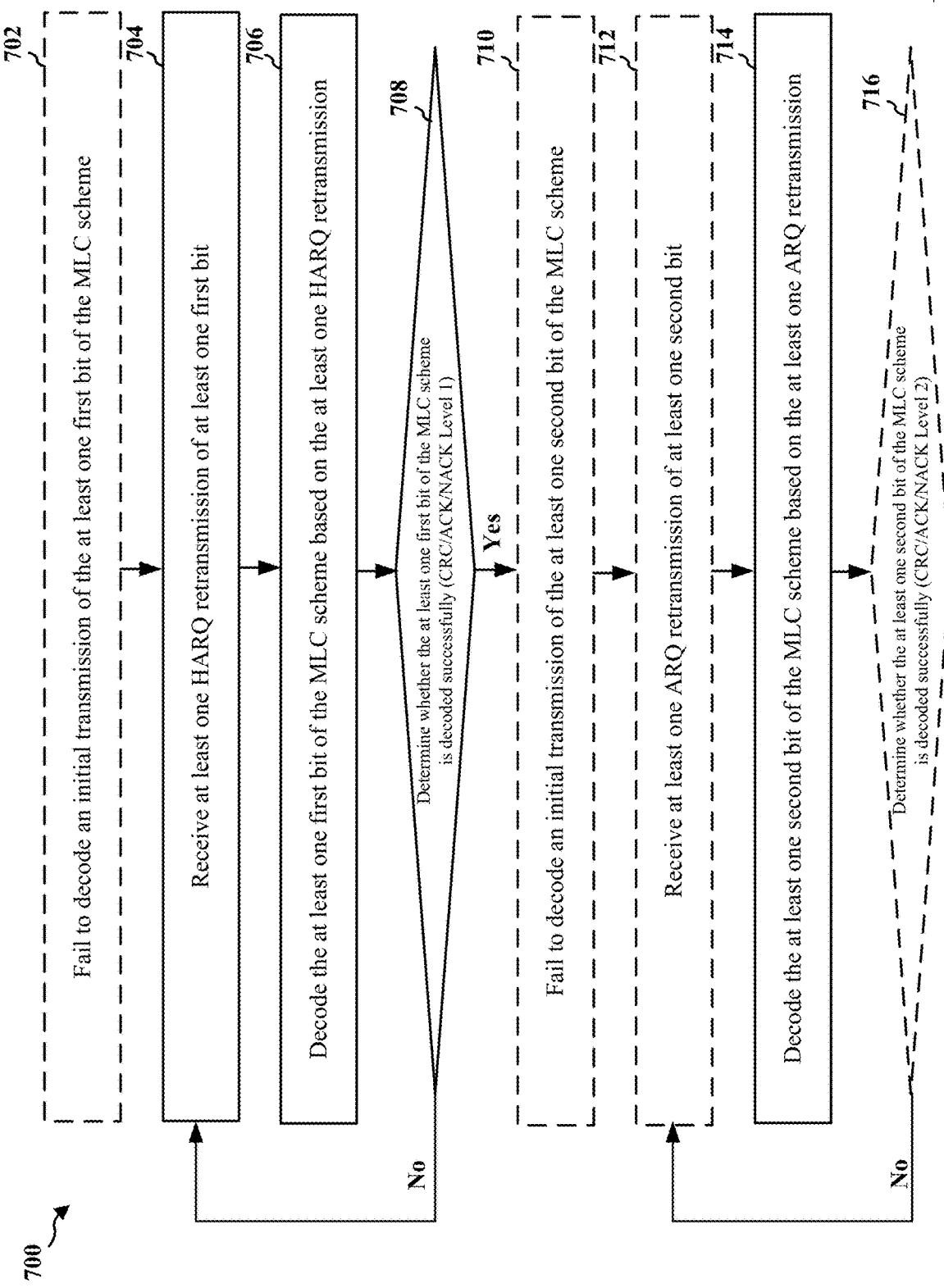
FIG. 7 is a flowchart of a method of wireless communication.

FIG. 7 is a flowchart 700 of a method of wireless communication. The method may be performed by a receiving device (e.g., the receiving device 602; the apparatus 902). When the receiving device corresponds to a UE (e.g., the UE 104), a base station (e.g., the base station 102/180) may correspond to the transmitting device. When the receiving device corresponds to a base station (e.g., the base station 102/180), a UE (e.g., the UE 104) may correspond to the transmitting device. At 704, the receiving device may receive at least one HARQ retransmission of at least one first bit. The HARQ retransmission may be associated with an MLC scheme including MSD. The MLC scheme may include a plurality of bits with the at least one first bit and at least one second bit. The at least one first bit may correspond to a first level of the plurality of bits and the at least one second bit may correspond to a second level of the plurality of bits. For example, 704 may be performed by the MLC-MSD component 940 in FIG. 9. Referring to FIG. 6, for example, the receiving device 602 may receive at 616 at least one HARQ retransmission of at least one first bit.

At 706, the receiving device may decode the at least one first bit of the MLC scheme based on the at least one HARQ retransmission. For example, 706 may be performed by the MLC-MSD component 940 in FIG. 9. Referring to FIG. 6, for example, the receiving device 602 may decode at 618*a* the at least one first bit of the MLC scheme based on the at least one HARQ retransmission.

At 708, the receiving device may determine whether the at least one first bit of the MLC scheme is decoded successfully. If it is determined that the at least one first bit of the MLC scheme is not decoded successfully, the receiving device may receive additional HARQ retransmissions. For example, 708 may be performed by the MLC-MSD component 940 in FIG. 9. Referring to FIG. 6, for example, the receiving device 602 may determine at 618*b* whether the at least one first bit of the MLC scheme is decoded successfully.

At 714, the receiving device may decode, upon determining at 708 that the at least one first bit of the MLC scheme is decoded successfully, the at least one second bit of the MLC scheme based on at least one ARQ retransmission of the at least one second bit. For example, 714 may be performed by the MLC-MSD component 940 in FIG. 9. Referring to FIG. 6, for example, the receiving device 602 may decode at 628*a*, upon determining at 618*b* that the at least one first bit of the MLC scheme is decoded successfully, the at least one second bit of the MLC scheme based on at least one ARQ retransmission of the at least one second bit.

In one configuration, the at least one HARQ retransmission may be received via one or more HARQ resources.

At 702, the receiving device may fail to decode, prior to receiving at 704 the at least one HARQ retransmission, an initial transmission of the at least one first bit of the MLC scheme without the at least one HARQ retransmission. For example, 702 may be performed by the MLC-MSD component 940 in FIG. 9. Referring to FIG. 6, for example, the receiving device 602 may fail to decode at 610, prior to receiving at 616 the at least one HARQ retransmission, an initial transmission of the at least one first bit of the MLC scheme without the at least one HARQ retransmission.

In one configuration, the at least one first bit of the MLC scheme may be decoded successfully when the at least one first bit does not experience a CRC failure.

At 710, the receiving device may fail to decode, prior to decoding at 714 the at least one second bit of the MLC scheme based on the at least one ARQ retransmission, an initial transmission of the at least one second bit of the MLC scheme without the at least one ARQ retransmission. For example, 710 may be performed by the MLC-MSD component 940 in FIG. 9. Referring to FIG. 6, for example, the receiving device 602 may fail to decode at 620, prior to decoding at 628*a* the at least one second bit of the MLC scheme based on the at least one ARQ retransmission, an initial transmission of the at least one second bit of the MLC scheme without the at least one ARQ retransmission.

At 712, the receiving device may receive the at least one ARQ retransmission of the at least one second bit. For example, 712 may be performed by the MLC-MSD component 940 in FIG. 9. Referring to FIG. 6, for example, the receiving device 602 may receive at 626 the at least one ARQ retransmission of the at least one second bit.

At 716, the receiving device may determine whether the at least one second bit of the MLC scheme is decoded successfully. For example, 716 may be performed by the MLC-MSD component 940 in FIG. 9. Referring to FIG. 6, for example, the receiving device 602 may determine at 628*b* whether the at least one second bit of the MLC scheme is decoded successfully.

In one configuration, the at least one second bit of the MLC scheme may be decoded successfully when the at least one second bit does not experience a CRC failure.

In one configuration, at least one sample of the at least one second bit may be stored before the determination at 708 that the at least one first bit of the MLC scheme is decoded successfully. In one configuration, at least one LLR associated with the at least one first bit may be stored in a buffer associated with the at least one HARQ retransmission before the determination at 708 that the at least one first bit of the MLC scheme is decoded successfully.

In one configuration, each of the first level or the second level of the plurality of bits may be associated with a CW, a TB, or a CBG. In one configuration, the first level and the second level of the plurality of bits may be associated with separate ACK/NACK signaling.

In one configuration, a DCI field may indicate the at least one HARQ retransmission of the at least one first bit. In one configuration, the DCI may not indicate the at least one ARQ retransmission of the at least one second bit.

In one configuration, the at least one HARQ retransmission of the at least one first bit may be associated with a RV variant. In one configuration, the at least one HARQ retransmission of the at least one first bit may be associated with at least one of a code rate or a modulation order that may be less than a code rate or a modulation order of an initial transmission of the at least one first bit.

In one configuration, the second level of the plurality of bits of the MLC scheme may be uncoded or coded with a high rate low complexity code.

Figure 8:
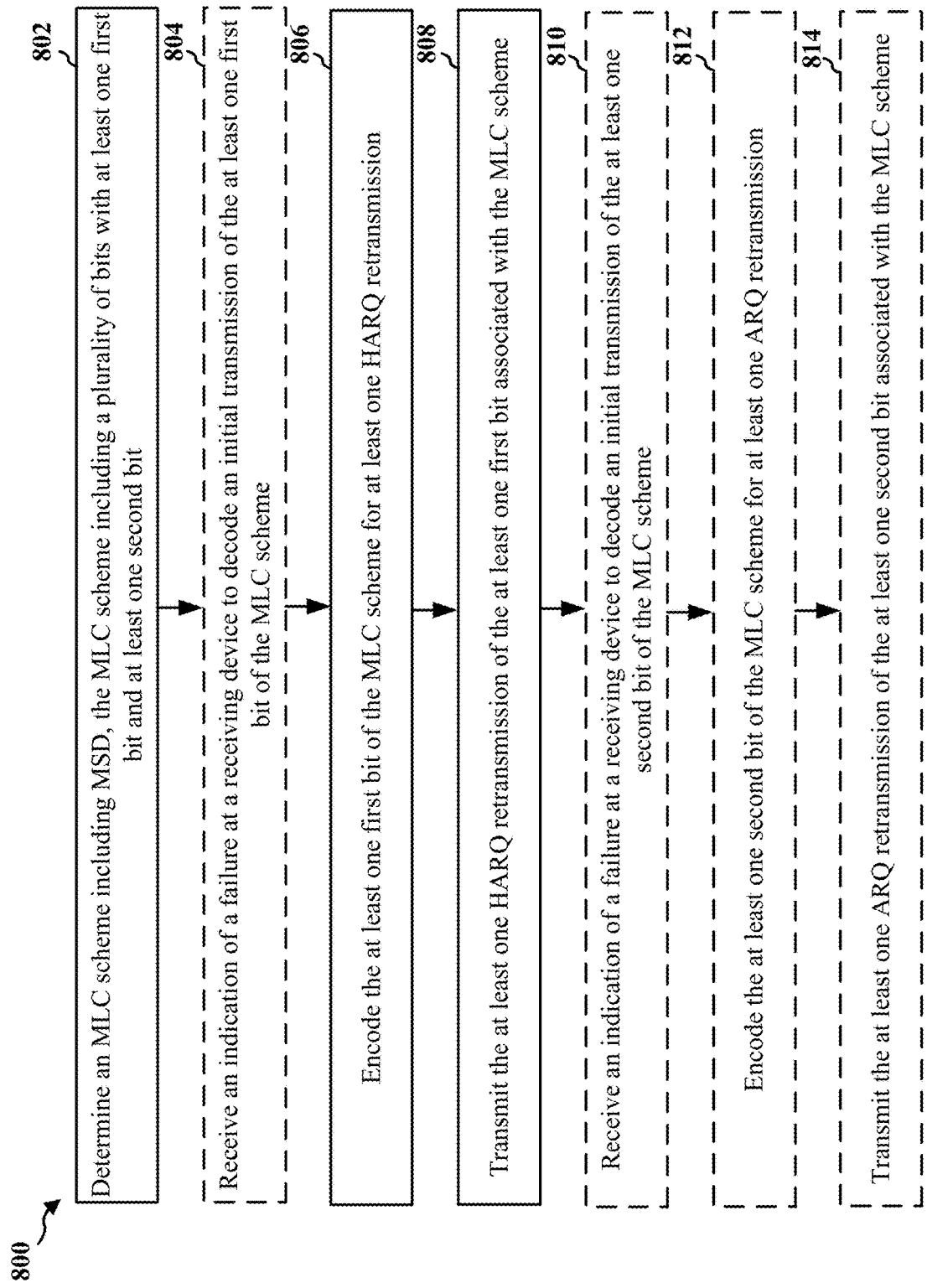
FIG. 8 is a flowchart of a method of wireless communication.

FIG. 8 is a flowchart 800 of a method of wireless communication. The method may be performed by a transmitting device (e.g., the transmitting device 604; the apparatus 1002). When the transmitting device corresponds to a UE (e.g., the UE 104), a base station (e.g., the base station 102/180) may correspond to the receiving device. When the transmitting device corresponds to a base station (e.g., the base station 102/180), a UE (e.g., the UE 104) may correspond to the receiving device. At 802, the transmitting device may determine an MLC scheme including MSD. The MLC scheme may include a plurality of bits with at least one first bit and at least one second bit. The at least one first bit may correspond to a first level of the plurality of bits and the at least one second bit may correspond to a second level of the plurality of bits. For example, 802 may be performed by the MLC-MSD component 1040 in FIG. 10. Referring to FIG. 6, for example, the transmitting device 604 may determine at 606 an MLC scheme including MSD.

At 806, the transmitting device may encode the at least one first bit of the MLC scheme for at least one HARQ retransmission. For example, 806 may be performed by the MLC-MSD component 1040 in FIG. 10. Referring to FIG. 6, for example, the transmitting device 604 may encode at 614 the at least one first bit of the MLC scheme for at least one HARQ retransmission.

At 808, the transmitting device may transmit, upon encoding at 806 the at least one first bit of the MLC scheme, the at least one HARQ retransmission of the at least one first bit associated with the MLC scheme. For example, 808 may be performed by the MLC-MSD component 1040 in FIG. 10. Referring to FIG. 6, for example, the transmitting device 604 may transmit at 616, upon encoding at 614 the at least one first bit of the MLC scheme, the at least one HARQ retransmission of the at least one first bit associated with the MLC scheme.

In one configuration, the at least one HARQ retransmission may be transmitted via one or more HARQ resources.

At 804, the transmitting device may receive, prior to encoding at 806 the at least one first bit of the MLC scheme for the at least one HARQ retransmission, an indication of a failure at a receiving device to decode an initial transmission of the at least one first bit of the MLC scheme without the at least one HARQ retransmission. For example, 804 may be performed by the MLC-MSD component 1040 in FIG. 10. Referring to FIG. 6, for example, the transmitting device 604 may receive at 612, prior to encoding at 614 the at least one first bit of the MLC scheme for the at least one HARQ retransmission, an indication of a failure at a receiving device 602 to decode an initial transmission of the at least one first bit of the MLC scheme without the at least one HARQ retransmission.

At 812, the transmitting device may encode the at least one second bit of the MLC scheme for at least one ARQ retransmission. For example, 812 may be performed by the MLC-MSD component 1040 in FIG. 10. Referring to FIG. 6, for example, the transmitting device 604 may encode at 624 the at least one second bit of the MLC scheme for at least one ARQ retransmission.

At 814, the transmitting device may transmit, upon encoding at 812 the at least one second bit of the MLC scheme, the at least one ARQ retransmission of the at least one second bit associated with the MLC scheme. For example, 814 may be performed by the MLC-MSD component 1040 in FIG. 10. Referring to FIG. 6, for example, the transmitting device 604 may transmit at 626, upon encoding at 624 the at least one second bit of the MLC scheme, the at least one ARQ retransmission of the at least one second bit associated with the MLC scheme.

At 810, the transmitting device may receive, prior to encoding at 812 the at least one second bit of the MLC scheme for the at least one ARQ retransmission, an indication of a failure at a receiving device to decode an initial transmission of the at least one second bit of the MLC scheme without the at least one ARQ retransmission. For example, 810 may be performed by the MLC-MSD component 1040 in FIG. 10. Referring to FIG. 6, for example, the transmitting device 604 may receive at 622, prior to encoding at 624 the at least one second bit of the MLC scheme for the at least one ARQ retransmission, an indication of a failure at a receiving device 602 to decode an initial transmission of the at least one second bit of the MLC scheme without the at least one ARQ retransmission.

In one configuration, a DCI field may indicate the at least one HARQ retransmission of the at least one first bit. In one configuration, the DCI may not indicate the at least one ARQ retransmission of the at least one second bit.

In one configuration, each of the first level or the second level of the plurality of bits may be associated with a CW, a TB, or a CBG. In one configuration, the first level and the second level of the plurality of bits may be associated with separate ACK/NACK signaling.

In one configuration, the at least one HARQ retransmission of the at least one first bit may be associated with a RV variant. In one configuration, the at least one HARQ retransmission of the at least one first bit may be associated with at least one of a code rate or a modulation order that is less than a code rate or a modulation order of an initial transmission of the at least one first bit.

In one configuration, the second level of the plurality of bits of the MLC scheme may be uncoded or coded with a high rate low complexity code.

Figure 9:
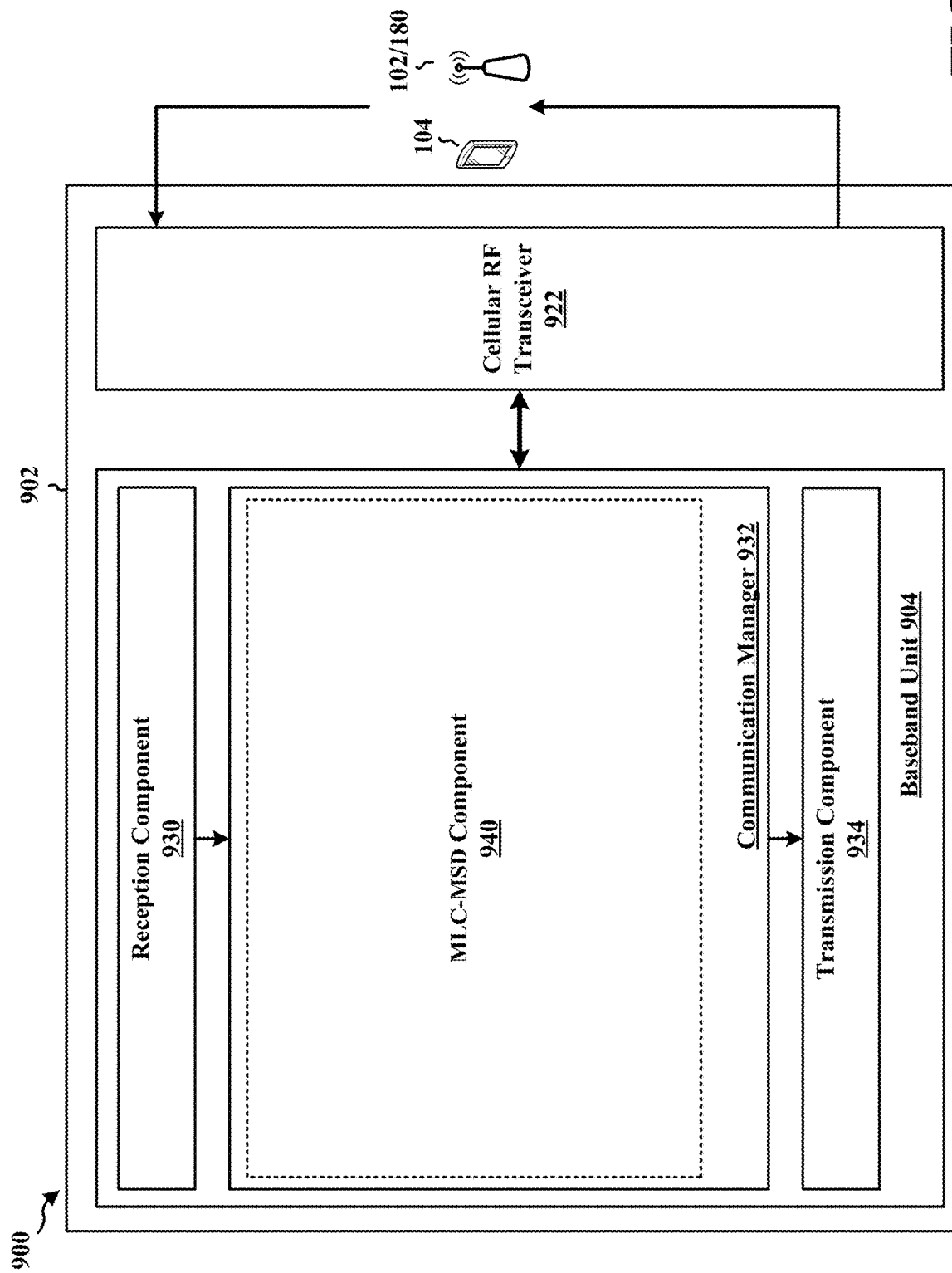
FIG. 9 is a diagram illustrating an example of a hardware implementation for an example apparatus.

FIG. 9 is a diagram 900 illustrating an example of a hardware implementation for an apparatus 902. The apparatus 902 is a receiving device and includes a baseband unit 904. The baseband unit 904 may communicate through a cellular RF transceiver 922 with either the UE 104 (when the apparatus 902 corresponds to a base station) or the base station 102/180 (when the apparatus 902 corresponds to a UE). The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310/UE 350 and may include the memory 376/360 and/or at least one of the TX processor 316/368, the RX processor 370/356, and the controller/processor 375/359.

The communication manager 932 includes an MLC-MSD component 940 that may be configured to receive at least one HARQ retransmission of at least one first bit, the HARQ retransmission being associated with an MLC scheme including MSD, the MLC scheme including a plurality of bits with the at least one first bit and at least one second bit, the at least one first bit corresponding to a first level of the plurality of bits and the at least one second bit corresponding to a second level of the plurality of bits, e.g., as described in connection with 704 in FIG. 7. The MLC-MSD component 940 may be further configured to decode the at least one first bit of the MLC scheme based on the at least one HARQ retransmission, e.g., as described in connection with 706 in FIG. 7. The MLC-MSD component 940 may be further configured to determine whether the at least one first bit of the MLC scheme is decoded successfully, e.g., as described in connection with 708 in FIG. 7. The MLC-MSD component 940 may be further configured to decode, upon determining that the at least one first bit of the MLC scheme is decoded successfully, the at least one second bit of the MLC scheme based on at least one ARQ retransmission of the at least one second bit, e.g., as described in connection with 714 in FIG. 7.

The apparatus may include additional components that perform each of the blocks of the algorithm in the aforementioned flowcharts of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for receiving at least one HARQ retransmission of at least one first bit. The HARQ retransmission may be associated with an MLC scheme including MSD. The MLC scheme may include a plurality of bits with the at least one first bit and at least one second bit. The at least one first bit may correspond to a first level of the plurality of bits and the at least one second bit may correspond to a second level of the plurality of bits. The apparatus 902 may further include means for decoding the at least one first bit of the MLC scheme based on the at least one HARQ retransmission. The apparatus 902 may further include means for determining whether the at least one first bit of the MLC scheme is decoded successfully. The apparatus 902 may further include means for decoding, upon determining that the at least one first bit of the MLC scheme is decoded successfully, the at least one second bit of the MLC scheme based on at least one ARQ retransmission of the at least one second bit.

In one configuration, the at least one HARQ retransmission may be received via one or more HARQ resources. In one configuration, the apparatus 902 may further include means for failing to decode, prior to receiving the at least one HARQ retransmission, an initial transmission of the at least one first bit of the MLC scheme without the at least one HARQ retransmission. In one configuration, the at least one first bit of the MLC scheme may be decoded successfully when the at least one first bit does not experience a CRC failure. In one configuration, the apparatus 902 may further include means for failing to decode, prior to decoding the at least one second bit of the MLC scheme based on the at least one ARQ retransmission, an initial transmission of the at least one second bit of the MLC scheme without the at least one ARQ retransmission; and means for receiving the at least one ARQ retransmission of the at least one second bit. In one configuration, the apparatus 902 may further include means for determining whether the at least one second bit of the MLC scheme is decoded successfully. In one configuration, the at least one second bit of the MLC scheme may be decoded successfully when the at least one second bit does not experience a CRC failure. In one configuration, at least one sample of the at least one second bit may be stored before the determination that the at least one first bit of the MLC scheme is decoded successfully. In one configuration, at least one LLR associated with the at least one first bit may be stored in a buffer associated with the at least one HARQ retransmission before the determination that the at least one first bit of the MLC scheme is decoded successfully. In one configuration, each of the first level or the second level of the plurality of bits may be associated with a CW, a TB, or a CBG. In one configuration, the first level and the second level of the plurality of bits may be associated with separate ACK/NACK signaling. In one configuration, a DCI field may indicate the at least one HARQ retransmission of the at least one first bit. In one configuration, the DCI may not indicate the at least one ARQ retransmission of the at least one second bit. In one configuration, the at least one HARQ retransmission of the at least one first bit may be associated with a RV variant. In one configuration, the at least one HARQ retransmission of the at least one first bit may be associated with at least one of a code rate or a modulation order that is less than a code rate or a modulation order of an initial transmission of the at least one first bit. In one configuration, the second level of the plurality of bits of the MLC scheme may be uncoded or coded with a high rate low complexity code.

The aforementioned means may be one or more of the aforementioned components of the apparatus 902 configured to perform the functions recited by the aforementioned means. As described supra, the apparatus 902 may include the TX Processor 316/368, the RX Processor 370/356, and the controller/processor 375/359. As such, in one configuration, the aforementioned means may be the TX Processor 316/368, the RX Processor 370/356, and the controller/processor 375/359 configured to perform the functions recited by the aforementioned means.

Figure 10:
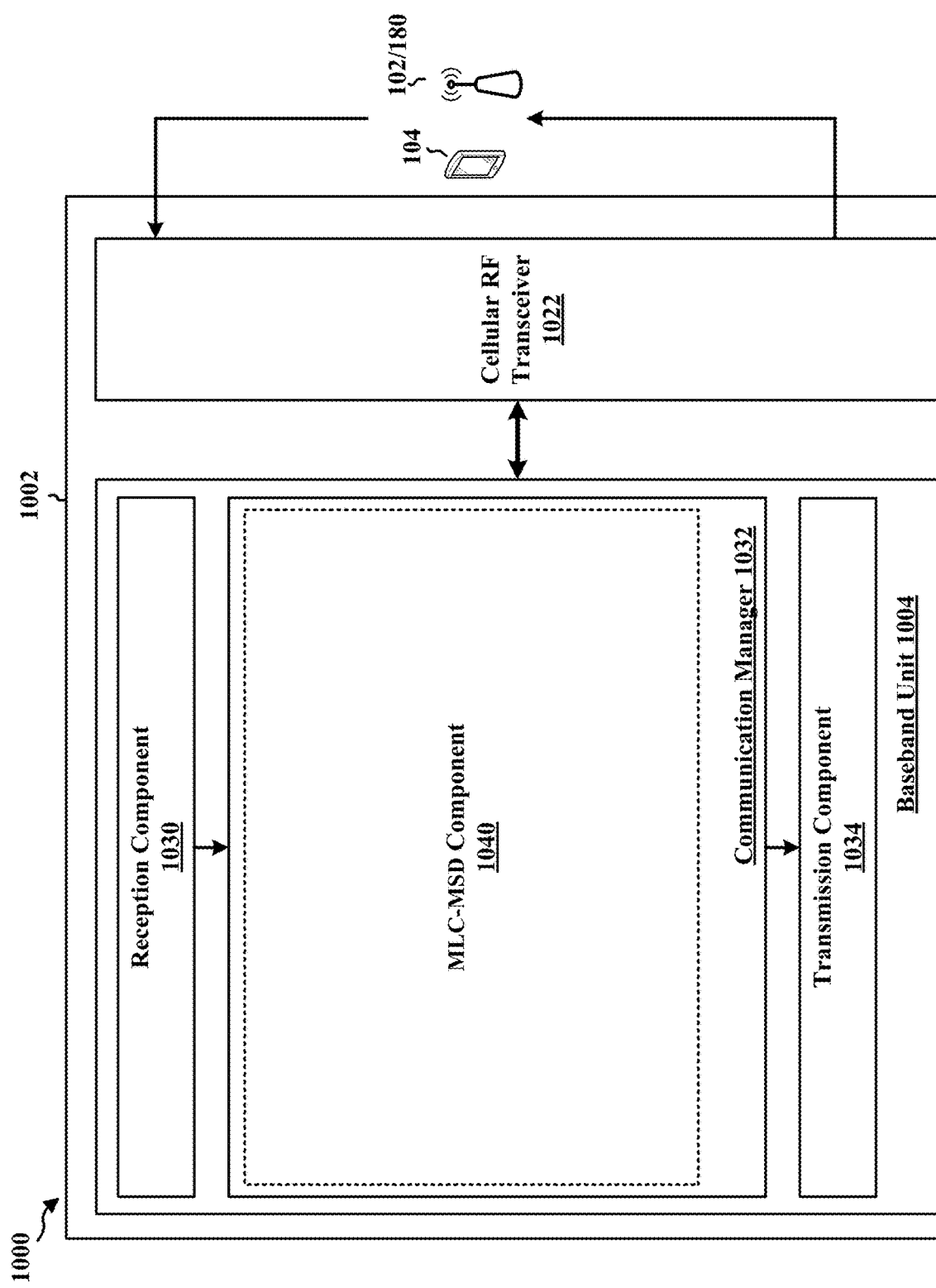
FIG. 10 is a diagram illustrating an example of a hardware implementation for an example apparatus.

FIG. 10 is a diagram 1000 illustrating an example of a hardware implementation for an apparatus 1002. The apparatus 1002 is a transmitting device and includes a baseband unit 1004. The baseband unit 1004 may communicate through a cellular RF transceiver 1022 with either the UE 104 (when the apparatus 1002 corresponds to a base station) or the base station 102/180 (when the apparatus 1002 corresponds to a UE). The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310/UE 350 and may include the memory 376/350 and/or at least one of the TX processor 316/368, the RX processor 370/356, and the controller/processor 375/359.

The communication manager 1032 includes an MLC-MSD component 1040 that may be configured to determine an MLC scheme including MSD, the MLC scheme including a plurality of bits with at least one first bit and at least one second bit, the at least one first bit corresponding to a first level of the plurality of bits and the at least one second bit corresponding to a second level of the plurality of bits, e.g., as described in connection with 802 in FIG. 8. The MLC-MSD component 1040 may be further configured to encode the at least one first bit of the MLC scheme for at least one HARQ retransmission, e.g., as described in connection with 806 in FIG. 8. The MLC-MSD component 1040 may be further configured to transmit, upon encoding the at least one first bit of the MLC scheme, the at least one HARQ retransmission of the at least one first bit associated with the MLC scheme, e.g., as described in connection with 808 in FIG. 8.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for determining an MLC scheme including MSD. The MLC scheme may include a plurality of bits with at least one first bit and at least one second bit. The at least one first bit may correspond to a first level of the plurality of bits and the at least one second bit may correspond to a second level of the plurality of bits. The apparatus 1002 may further include means for encoding the at least one first bit of the MLC scheme for at least one HARQ retransmission. The apparatus 1002 may further include means for transmitting, upon encoding the at least one first bit of the MLC scheme, the at least one HARQ retransmission of the at least one first bit associated with the MLC scheme.

In one configuration, the at least one HARQ retransmission may be transmitted via one or more HARQ resources. In one configuration, the apparatus 1002 may further include means for receiving, prior to encoding the at least one first bit of the MLC scheme for the at least one HARQ retransmission, an indication of a failure at a receiving device to decode an initial transmission of the at least one first bit of the MLC scheme without the at least one HARQ retransmission. In one configuration, the apparatus 1002 may further include means for encoding the at least one second bit of the MLC scheme for at least one ARQ retransmission; and means for transmitting, upon encoding the at least one second bit of the MLC scheme, the at least one ARQ retransmission of the at least one second bit associated with the MLC scheme. In one configuration, the apparatus 1002 may further include means for receiving, prior to encoding the at least one second bit of the MLC scheme for the at least one ARQ retransmission, an indication of a failure at a receiving device to decode an initial transmission of the at least one second bit of the MLC scheme without the at least one ARQ retransmission. In one configuration, a DCI field may indicate the at least one HARQ retransmission of the at least one first bit. In one configuration, the DCI may not indicate the at least one ARQ retransmission of the at least one second bit. In one configuration, each of the first level or the second level of the plurality of bits may be associated with a CW, a TB, or a CBG. In one configuration, the first level and the second level of the plurality of bits may be associated with separate ACK/NACK signaling. In one configuration, the at least one HARQ retransmission of the at least one first bit may be associated with a RV variant. In one configuration, the at least one HARQ retransmission of the at least one first bit may be associated with at least one of a code rate or a modulation order that is less than a code rate or a modulation order of an initial transmission of the at least one first bit. In one configuration, the second level of the plurality of bits of the MLC scheme may be uncoded or coded with a high rate low complexity code.

The aforementioned means may be one or more of the aforementioned components of the apparatus 1002 configured to perform the functions recited by the aforementioned means. As described supra, the apparatus 1002 may include the TX Processor 316/368, the RX Processor 370/356, and the controller/processor 375/359. As such, in one configuration, the aforementioned means may be the TX Processor 316/368, the RX Processor 370/356, and the controller/processor 375/359 configured to perform the functions recited by the aforementioned means.

As described above, according to some aspects, error correction may be applied in a communication based on a 2-level MLC scheme. In particular, HARQ retransmissions may be dedicated to Level 1, and simple ARQ retransmissions may be utilized for Level 2. For communications over a suitable channel, aspects may bring about a reduction in retransmission volume, a lower complexity HARQ scheme, a reduction in power consumption, and/or a throughput enhancement. Therefore, for example, sub-THz communications may be made more reliable and less power-hungry.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a receiving device, including: receiving at least one HARQ retransmission of at least one first bit, the HARQ retransmission being associated with an MLC scheme including MSD, the MLC scheme including a plurality of bits with the at least one first bit and at least one second bit, the at least one first bit corresponding to a first level of the plurality of bits and the at least one second bit corresponding to a second level of the plurality of bits; decoding the at least one first bit of the MLC scheme based on the at least one HARQ retransmission; determining whether the at least one first bit of the MLC scheme is decoded successfully; and decoding, upon determining that the at least one first bit of the MLC scheme is decoded successfully, the at least one second bit of the MLC scheme based on at least one ARQ retransmission of the at least one second bit.

Aspect 2 is the method of aspect 1, where the at least one HARQ retransmission is received via one or more HARQ resources.

Aspect 3 is the method of any of aspects 1 and 2, further including: failing to decode, prior to receiving the at least one HARQ retransmission, an initial transmission of the at least one first bit of the MLC scheme without the at least one HARQ retransmission.

Aspect 4 is the method of any of aspects 1 to 3, where the at least one first bit of the MLC scheme is decoded successfully when the at least one first bit does not experience a CRC failure.

Aspect 5 is the method of any of aspects 1 to 4, further including: failing to decode, prior to decoding the at least one second bit of the MLC scheme based on the at least one ARQ retransmission, an initial transmission of the at least one second bit of the MLC scheme without the at least one ARQ retransmission; and receiving the at least one ARQ retransmission of the at least one second bit.

Aspect 6 is the method of any of aspects 1 to 5, further including: determining whether the at least one second bit of the MLC scheme is decoded successfully.

Aspect 7 is the method of aspect 6, where the at least one second bit of the MLC scheme is decoded successfully when the at least one second bit does not experience a CRC failure.

Aspect 8 is the method of any of aspects 1 to 7, where at least one sample of the at least one second bit is stored before the determination that the at least one first bit of the MLC scheme is decoded successfully.

Aspect 9 is the method of any of aspects 1 to 8, where at least one LLR associated with the at least one first bit is stored in a buffer associated with the at least one HARQ retransmission before the determination that the at least one first bit of the MLC scheme is decoded successfully.

Aspect 10 is the method of any of aspects 1 to 9, where each of the first level or the second level of the plurality of bits is associated with a CW, a TB, or a CBG.

Aspect 11 is the method of aspect 10, where the first level and the second level of the plurality of bits are associated with separate ACK/NACK signaling.

Aspect 12 is the method of any of aspects 1 to 11, where a DCI field indicates the at least one HARQ retransmission of the at least one first bit.

Aspect 13 is the method of aspect 12, where the DCI does not indicate the at least one ARQ retransmission of the at least one second bit.

Aspect 14 is the method of any of aspects 1 to 13, where the at least one HARQ retransmission of the at least one first bit is associated with a RV variant.

Aspect 15 is the method of any of aspects 1 to 14, where the at least one HARQ retransmission of the at least one first bit is associated with at least one of a code rate or a modulation order that is less than a code rate or a modulation order of an initial transmission of the at least one first bit.

Aspect 16 is the method of any of aspects 1 to 15, where the second level of the plurality of bits of the MLC scheme is uncoded or coded with a high rate low complexity code.

Aspect 17 is an apparatus for wireless communication including at least one processor coupled to a memory and configured to implement a method as in any of aspects 1 to 16.

Aspect 18 is an apparatus for wireless communication including means for implementing a method as in any of aspects 1 to 16.

Aspect 19 is a computer-readable medium storing computer executable code, where the code when executed by a processor causes the processor to implement a method as in any of aspects 1 to 16.

Aspect 20 is a method of wireless communication of a transmitting device, including: determining an MLC scheme including MSD, the MLC scheme including a plurality of bits with at least one first bit and at least one second bit, the at least one first bit corresponding to a first level of the plurality of bits and the at least one second bit corresponding to a second level of the plurality of bits; encoding the at least one first bit of the MLC scheme for at least one HARQ retransmission; and transmitting, upon encoding the at least one first bit of the MLC scheme, the at least one HARQ retransmission of the at least one first bit associated with the MLC scheme.

Aspect 21 is the method of aspect 20, where the at least one HARQ retransmission is transmitted via one or more HARQ resources.

Aspect 22 is the method of any of aspects 20 and 21, further including:

receiving, prior to encoding the at least one first bit of the MLC scheme for the at least one HARQ retransmission, an indication of a failure at a receiving device to decode an initial transmission of the at least one first bit of the MLC scheme without the at least one HARQ retransmission.

Aspect 23 is the method of any of aspects 20 to 22, further including: encoding the at least one second bit of the MLC scheme for at least one ARQ retransmission; and transmitting, upon encoding the at least one second bit of the MLC scheme, the at least one ARQ retransmission of the at least one second bit associated with the MLC scheme.

Aspect 24 is the method of aspect 23, further including: receiving, prior to encoding the at least one second bit of the MLC scheme for the at least one ARQ retransmission, an indication of a failure at a receiving device to decode an initial transmission of the at least one second bit of the MLC scheme without the at least one ARQ retransmission.

Aspect 25 is the method of any of aspects 23 and 24, where a DCI field indicates the at least one HARQ retransmission of the at least one first bit.

Aspect 26 is the method of aspect 25, where the DCI does not indicate the at least one ARQ retransmission of the at least one second bit.

Aspect 27 is the method of any of aspects 20 to 26, where each of the first level or the second level of the plurality of bits is associated with a CW, a TB, or a CBG.

Aspect 28 is the method of aspect 27, where the first level and the second level of the plurality of bits are associated with separate ACK/NACK signaling.

Aspect 29 is the method of any of aspects 20 to 28, where the at least one HARQ retransmission of the at least one first bit is associated with a RV variant.

Aspect 30 is the method of any of aspects 20 to 29, where the at least one HARQ retransmission of the at least one first bit is associated with at least one of a code rate or a modulation order that is less than a code rate or a modulation order of an initial transmission of the at least one first bit.

Aspect 31 is the method of any of aspects 20 to 30, where the second level of the plurality of bits of the MLC scheme is uncoded or coded with a high rate low complexity code.

Aspect 32 is an apparatus for wireless communication including at least one processor coupled to a memory and configured to implement a method as in any of aspects 20 to 31.

Aspect 33 is an apparatus for wireless communication including means for implementing a method as in any of aspects 20 to 31.

Aspect 34 is a computer-readable medium storing computer executable code, where the code when executed by a processor causes the processor to implement a method as in any of aspects 20 to 31.

What is claimed is:

1. A method of wireless communication of a receiving device, comprising:
    receiving at least one hybrid automatic repeat request (HARQ) retransmission of at least one first bit, the HARQ retransmission being associated with a multi-level coding (MLC) scheme including multi-stage-decoding (MSD), the MLC scheme including a plurality of bits with the at least one first bit and at least one second bit, the at least one first bit corresponding to a first level of the plurality of bits and the at least one second bit corresponding to a second level of the plurality of bits;
    decoding the at least one first bit of the MLC scheme based on the at least one HARQ retransmission;
    determining whether the at least one first bit of the MLC scheme is decoded successfully; and
    decoding, upon determining that the at least one first bit of the MLC scheme is decoded successfully, the at least one second bit of the MLC scheme based on at least one automatic repeat request (ARQ) retransmission of the at least one second bit.

2. The method of claim 1, wherein the at least one HARQ retransmission is received via one or more HARQ resources.

3. The method of claim 1, further comprising:
    failing to decode, prior to receiving the at least one HARQ retransmission, an initial transmission of the at least one first bit of the MLC scheme without the at least one HARQ retransmission.

4. The method of claim 1, wherein the at least one first bit of the MLC scheme is decoded successfully when the at least one first bit does not experience a cyclic redundancy check (CRC) failure.

5. The method of claim 1, further comprising:
    failing to decode, prior to decoding the at least one second bit of the MLC scheme based on the at least one ARQ retransmission, an initial transmission of the at least one second bit of the MLC scheme without the at least one ARQ retransmission; and
    receiving the at least one ARQ retransmission of the at least one second bit.

6. The method of claim 1, further comprising:
    determining whether the at least one second bit of the MLC scheme is decoded successfully.

7. The method of claim 6, wherein the at least one second bit of the MLC scheme is decoded successfully when the at least one second bit does not experience a cyclic redundancy check (CRC) failure.

8. The method of claim 1, wherein at least one sample of the at least one second bit is stored before the determination that the at least one first bit of the MLC scheme is decoded successfully.

9. The method of claim 1, wherein at least one log-likelihood ratio (LLR) associated with the at least one first bit is stored in a buffer associated with the at least one HARQ retransmission before the determination that the at least one first bit of the MLC scheme is decoded successfully.

10. The method of claim 1, wherein each of the first level or the second level of the plurality of bits is associated with a code word (CW), a transport block (TB), or a code block group (CBG).

11. The method of claim 10, wherein the first level and the second level of the plurality of bits are associated with separate acknowledgment (ACK)/negative-ACK (NACK) (ACK/NACK) signaling.

12. The method of claim 1, wherein a downlink control information (DCI) field indicates the at least one HARQ retransmission of the at least one first bit.

13. The method of claim 12, wherein the DCI does not indicate the at least one ARQ retransmission of the at least one second bit.

14. The method of claim 1, wherein the at least one HARQ retransmission of the at least one first bit is associated with a redundancy version (RV) variant.

15. The method of claim 1, wherein the at least one HARQ retransmission of the at least one first bit is associated with at least one of a code rate or a modulation order that is less than a code rate or a modulation order of an initial transmission of the at least one first bit.

16. The method of claim 1, wherein the second level of the plurality of bits of the MLC scheme is uncoded or coded with a high rate low complexity code.

17. An apparatus for wireless communication, the apparatus being a receiving device, comprising:
    a memory; and
    at least one processor coupled to the memory and configured to:
        receive at least one hybrid automatic repeat request (HARQ) retransmission of at least one first bit, the HARQ retransmission being associated with a multi-level coding (MLC) scheme including multi-stage-decoding (MSD), the MLC scheme including a plurality of bits with the at least one first bit and at least one second bit, the at least one first bit corresponding to a first level of the plurality of bits and the at least one second bit corresponding to a second level of the plurality of bits;
        decode the at least one first bit of the MLC scheme based on the at least one HARQ retransmission;
        determine whether the at least one first bit of the MLC scheme is decoded successfully; and
        decode, upon determining that the at least one first bit of the MLC scheme is decoded successfully, the at least one second bit of the MLC scheme based on at least one automatic repeat request (ARQ) retransmission of the at least one second bit.

18. A method of wireless communication of a transmitting device, comprising:
    determining a multi-level coding (MLC) scheme including multi-stage-decoding (MSD), the MLC scheme including a plurality of bits with at least one first bit and at least one second bit, the at least one first bit corresponding to a first level of the plurality of bits and the at least one second bit corresponding to a second level of the plurality of bits;
    encoding the at least one first bit of the MLC scheme for at least one hybrid automatic repeat request (HARQ) retransmission;

encoding the at least one second bit of the MLC scheme for at least one automatic repeat request (ARQ) retransmission; and transmitting, upon encoding the at least one second bit of the MLC scheme, the at least one ARQ retransmission of the at least one second bit associated with the MLC scheme; and transmitting, upon encoding the at least one first bit of the MLC scheme, the at least one HARQ retransmission of the at least one first bit associated with the MLC scheme.

19. The method of claim 18, wherein the at least one HARQ retransmission is transmitted via one or more HARQ resources.

20. The method of claim 18, further comprising:
receiving, prior to encoding the at least one first bit of the MLC scheme for the at least one HARQ retransmission, an indication of a failure at a receiving device to decode an initial transmission of the at least one first bit of the MLC scheme without the at least one HARQ retransmission.

21. The method of claim 18, further comprising: receiving, prior to encoding the at least one second bit of the MLC scheme for the at least one ARQ retransmission, an indication of a failure at a receiving device to decode an initial transmission of the at least one second bit of the MLC scheme without the at least one ARQ retransmission.

22. The method of claim 18, wherein a downlink control information (DCI) field indicates the at least one HARQ retransmission of the at least one first bit.

23. The method of claim 22, wherein the DCI does not indicate the at least one ARQ retransmission of the at least one second bit.

24. The method of claim 18, wherein each of the first level or the second level of the plurality of bits is associated with a code word (CW), a transport block (TB), or a code block group (CBG).

25. The method of claim 24, wherein the first level and the second level of the plurality of bits are associated with separate acknowledgment (ACK)/negative-ACK (NACK) (ACK/NACK) signaling.

26. The method of claim 18, wherein the at least one HARQ retransmission of the at least one first bit is associated with a redundancy version (RV) variant.

27. The method of claim 18, wherein the at least one HARQ retransmission of the at least one first bit is associated with at least one of a code rate or a modulation order that is less than a code rate or a modulation order of an initial transmission of the at least one first bit.

28. The method of claim 18, wherein the second level of the plurality of bits of the MLC scheme is uncoded or coded with a high rate low complexity code.

29. An apparatus for wireless communication, the apparatus being a transmitting device, comprising:
a memory; and
at least one processor coupled to the memory and configured to:
determine a multi-level coding (MLC) scheme including multi-stage-decoding (MSD), the MLC scheme including a plurality of bits with at least one first bit and at least one second bit, the at least one first bit corresponding to a first level of the plurality of bits and the at least one second bit corresponding to a second level of the plurality of bits;
encode the at least one first bit of the MLC scheme for at least one hybrid automatic repeat request (HARQ) retransmission;
encode the at least one second bit of the MLC scheme for at least one automatic repeat request (ARQ) retransmission; and transmitting, upon encoding the at least one second bit of the MLC scheme, the at least one ARQ retransmission of the at least one second bit associated with the MLC scheme; and
transmit, upon encoding the at least one first bit of the MLC scheme, the at least one HARQ retransmission of the at least one first bit associated with the MLC scheme.

* * * * *